United States Patent
de Lega

(10) Patent No.: US 6,226,092 B1
(45) Date of Patent: May 1, 2001

(54) FULL-FIELD GEOMETRICALLY DESENSITIZED INTERFEROMETER USING REFRACTIVE OPTICS

(75) Inventor: Xavier Colonna de Lega, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 09/321,475

(22) Filed: May 27, 1999

(51) Int. Cl.⁷ .................................................. G01B 9/02
(52) U.S. Cl. .................................................. 356/512
(58) Field of Search .................... 356/357, 359, 356/360, 355, 511, 512, 513, 514

(56) References Cited

U.S. PATENT DOCUMENTS

| | | | |
|---|---|---|---|
| 3,958,884 | 5/1976 | Smith | 356/359 |
| 4,714,348 | 12/1987 | MaKosch | 356/359 |
| 5,526,116 | 6/1996 | de Groot | 356/359 |
| 5,568,256 | 10/1996 | Korner et al. | 356/359 |
| 5,598,265 | 1/1997 | de Groot | 356/359 |
| 5,671,050 | 9/1997 | de Groot | 356/359 |
| 5,995,224 | * 11/1999 | De Groot | 356/359 |

* cited by examiner

Primary Examiner—Samuel A. Turner
(74) Attorney, Agent, or Firm—Francis J. Caufield

(57) ABSTRACT

A full-field, geometrically-desensitized interferometer (GDI) instrument incorporates a combination of reflecting and refracting optics to perform beam splitting and recombining operations for surface profilometry. Symmetrically-positioned inbound and outbound optical subassemblies typically are arranged to direct inbound collimated beams from a light generator to the profiled surface of a test object and to direct outbound reflected beams to an imaging device as a single recombined outbound interference beam. Every point on the detector has a corresponding point on the object from which reflected illumination originated from both reflected beams. The optical path difference between the two inbound beams or between the two reflected outbound beams can be substantially independent of field position. The resultant instrument, in addition to being capable of full-field imaging, exhibits several advantages including 1) a large working distance, 2) the employment of readily-available non-diffractive elements, and 3) the ability to transmit light with high efficiency.

31 Claims, 10 Drawing Sheets

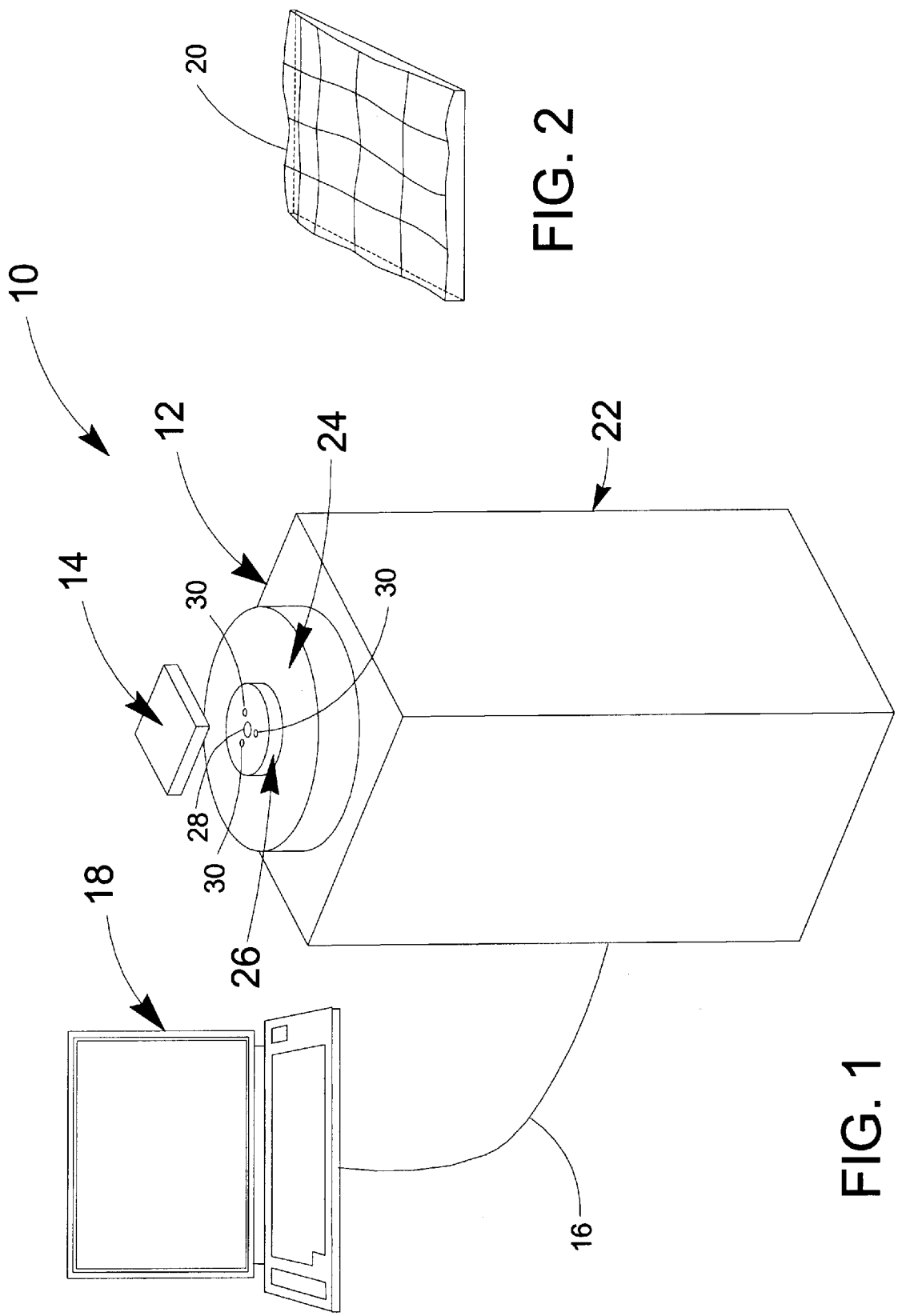

FULL-FIELD GEOMETRICALLY DESENSITIZED INTERFEROMETER USING REFRACTIVE OPTICS

CROSS REFERENCE TO RELATED APPLICATION

This application is related to commonly owned, U.S. patent application Ser. No. 09/014,663 filed on Jan. 28, 1998 in the name of Peter de Groot, now U.S. Pat. No. 5,995,224.

BACKGROUND OF THE INVENTION

The invention in general relates to interferometers and, more particularly, to geometrically-desensitized interferometer (GDI) instruments that utilize nondiffractive optics for full-field measurement of the profiles of surfaces.

Instruments for profiling surfaces are generally classified as either contact or noncontact types. With contact types, a stylus is used to mechanically move over the surface while in physical contact with it to build up information about surface features including their position and scale. Noncontact types are usually optically based and may be either scanning types or full-field types depending on whether or not a probe is moved over a surface in the manner of a stylus but not in contact with the surface or an area larger than that measured by a probe is imaged all at once.

Optical metrology of surface profiles can generally be divided into two regimes, namely interferometric and geometric. Geometric techniques include triangulation and moire fringe analysis, which involves the projection and imaging of a periodic structure such as a Ronchi ruling. Geometric techniques are relatively insensitive to surface roughness and deformations, but are of relatively low resolution thus making them unsuitable for many applications in which surface profiles must be measured with high precision.

Interferometry, on the other hand, relies on the wave nature of light for high precision measurement of the surface profile of a test object. A typical interferometer includes a light generator that produces a coherent beam of light followed by a beam divider that splits the beam into reference and measurement beams. The reference beam is then reflected off a reference surface, and the measurement beam off the object whose surface is to be profiled. First and second reflected wavefronts from the reference and measurement surfaces are then recombined with one another while interfering both constructively and destructively to produce an interference fringe pattern, the fringe pattern being a function of the optical path difference between the paths traveled by the reference and measurement beams. The optical path difference results in differences in phase as a result of the differences in optical path traveled between the reference and measurement beams. An imaging device, such as a solid state camera, receives the recombined wavefronts and acquires images of the interference fringe pattern. The interference fringe pattern then is analyzed to obtain information about the surface profile of the test object.

Fringe pattern analysis for surface profilometry often is performed by the well-known technique of phase shifting interferometry (PSI). In PSI, the height difference between locations on a surface imaged by first and second pixels on the imaging device is determined by first determining a phase difference between light received at the first and second pixels and by then using the phase difference to calculate a height difference. A primary advantage of PSI is that it is highly precise. The vertical height precision for PSI is a fraction (e.g., $\frac{1}{100}$) of the optical wavelength of the light source used to conduct the measurement. A second advantage of PSI is that it has good vibration immunity characteristics because phase data is acquired for all pixels simultaneously and because the data acquisition time is relatively short.

Generally speaking, however, conventional PSI approaches can profile only smooth surfaces having relatively small height variations or "surface departures" between adjacent measurement sites since conventional interferometry on a surface with high slopes generates such a high fringe density that no meaningful information can be derived from the fringe pattern. Therefore, while PSI interferometry is much more precise than geometric optical profilometry, it historically has been considered to be ill-suited for use with rough objects or objects having marked surface deformations.

One interferometric technique that lacks the quarter-wavelength constraint of PSI is the so-called scanning white light interferometry or SWLI. In SWLI, a white light illumination source or, more generally, one which is of a broad-band spectrum as opposed to being of a narrow-band spectrum (for example a laser), generates an interference pattern which contains, as a function of scan position, regions of high contrast for each location on the test surface. The scan position of high contrast for a given pixel indicates the height of the corresponding location on the test surface. Therefore, by comparing the temporal characteristics of these regions of high contrast with one another, a difference in height between two locations on the profiled surface can be determined. Unlike PSI, SWLI does not calculate height differences based on phase differences, and the PSI phase constraint therefore does not apply to SWLI. The maximum physical departure between adjacent measurement sites on a profiled surface therefore may be much larger with SWLI than with PSI.

However, SWLI has disadvantages of its own that hinder its use in industrial applications. For instance, the field of view is generally no larger than can be accommodated by standard microscope objectives.

Another disadvantage of typical SWLI techniques is that data acquisition is very slow. The slow speed is a consequence of the large amount of data which must be acquired, given the rate at which the interference effect varies with scan position. The slow speed creates additional problems, such as a high sensitivity to thermal distortions and mechanical strain during measurement.

Still another disadvantage of typical SWLI is its high sensitivity to vibration, which is due in part to the slow data acquisition speed, and in part to the extremely high sensitivity of the interference fringe pattern, which is easily corrupted by very small amounts of vibration. Recent years have seen an increased demand for the high speed, high precision metrology of the surface profiles of manufactured parts having large surface departures, i.e., having rough surfaces or surfaces with pronounced surface deformations. A corresponding demand has arisen for the acquisition of data during production as opposed to in the laboratory. For instance, precision products such as hard disks for computer disk drives need to be profiled with high precision, at high speeds, and under conditions in which the test object may be subjected to substantial vibrations during manufacturing processes. Neither traditional PSI techniques nor traditional SWLI techniques are suitable for these purposes. A need therefore has developed for a "desensitized" interferometer that is relatively insensitive to surface roughness and surface deformations, that performs surface metrology with high accuracy and at high speeds, and that is relatively insensitive to vibrations and therefore is well-suited to production-line use.

This need has been met to a large extent by the development of the geometrically-desensitized interferometer (GDI) instrument. A GDI instrument is characterized by the replacement of the beam splitter of the traditional instrument with an optical assembly located between the collimating lens and the test object. The optical assembly divides the collimated light source into two beams which propagate in two different directions and impinge on the profiled surface at the same location but at different incident angles. The beams reflect from the profiled surface and pass back through the optical assembly in different directions, after which they are recombined. Constructive and destructive interference of the reflected and recombined beams form an interference fringe pattern having an equivalent wavelength A that may be orders of magnitude larger than the source wavelength. As a result, GDI instruments are much less sensitive to height variations and surface deformations than are traditional interferometers using PSI analysis techniques. The sensitivity of GDI instruments is between that of conventional interferometry and moire fringe analysis, and is comparable to that obtained with grazing-incidence interferometry. GDI instruments therefore can be used in manufacturing applications and other applications that are unsuitable for traditional interferometry.

An exemplary GDI instrument is disclosed in U.S. Pat. No. 5,526,116 to de Groot (the de Groot '116 patent). Specifically, FIG. 2 of the de Groot '116 patent illustrates a diffractive optical assembly that includes first and second parallel linear phase gratings spaced from one another in the Z-direction of the instrument. The second grating produces the advantage of permitting the working distance between the exit surface of the grating assembly and the profiled surface of the test object to be typically about 2 inches. Both gratings are involved in both the splitting of an inbound beam and in the recombining of reflected beams from the object surface. Specifically, the first grating diffracts an inbound collimated beam from a light source into two first-order beams "A" and "B". The beams A and B are then redirected by the second grating so that they impinge on the profiled surface of the object at the same location but at different incident angles, $\alpha$ and $\beta$. Reflected beams A' and B' propagate outwardly from the profiled surface at corresponding angles $\alpha'$ and $\beta'$ and travel sequentially back through the second and first gratings to recombine with constructive and destructive interference. The recombined interfering beams, or wavefronts, form an interference pattern that is imaged onto a photodetector that generates a signal from which the pattern may be displayed and the surface profile determined. This information may also be converted to 3D visual map of the surface topography. Typically, the interference pattern provides for each point on the imaged object surface an interference phase that is substantially linearly proportional to the local surface height.

The typical grating-based GDI instrument exhibits all of the above-described advantages of GDI instruments. Moreover, because it requires only two optical elements to split and recombine the inbound and outbound beams, it is relatively compact, relatively easy to align, its alignment is relatively easy to maintain, and it has a relatively small sensitivity to air turbulence. Moreover, it constitutes a true full-field GDI instrument., The basic geometry of a full-field instrument provides a substantially linear and uniform response to surface topography over the entire imaged area of the object surface.

Some types of prior-art GDI instruments rely on beam splitters, lenses, mirrors, and/or other non-diffractive optical elements to split and recombine beams. GDI instruments of this type are disclosed, e.g., in U.S. Pat. No. 3,958,884 to Smith (the Smith patent), U.S. Pat. No. 4,714,348 to Makosch (the Makosch patent), and U.S. Pat. No. 5,568,256 to Korner, et al. For instance, the instrument illustrated in FIG. 6 of the Makosch patent employs a beam splitter and a plurality of mirrors to generate three collimated beams that are brought to interference in a symmetrical light field. When an object surface is brought into this light field, reflected beams are transmitted back through the system of splitters and mirrors and are recombined to form an interference pattern representative of the profile of the imaged surface.

However, known non-diffractive GDI instruments apparently have at least one very serious limitation that severely limits their practical range of applications. That is, unlike grating-based instruments, known conventional optics-based GDI instruments do not have full-field capability. This limitation arises from the fact that the field-independent path difference condition of a full-field instrument is not fulfilled by the mirrors or other conventional optical elements typically used in these instruments. For example, in the Makosch patent, the inbound beams exhibit a first OPD at one field position on the object surface as illustrated in FIG. 6 and exhibit a different OPD at a different field position, even if the object surface is perfectly flat. Depending on the manner in which interference data is acquired and interpreted, the actual field of view of the typical non-diffractive GDI instrument may therefore constitute no more than a point on the object surface relative to the instrument or, at best, a line extending along the object surface. Therefore, conventional optics-based instruments generally are limited to single-point profiling or, at best, linear profiling. A need therefore has arisen to provide a GDI instrument that has full-field imaging capability but does not necessarily require diffractive optic components, and it is a primary object of the present invention to provide such an instrument.

Other objects of the invention will in part be obvious and will in part appear hereinafter when reading the detailed description in connection with the various drawings.

SUMMARY OF THE INVENTION

The present invention relates to geometrically desensitized interferometric (GDI) instruments for measuring the profiles of smooth and rough surfaces with full-field imaging over relatively large working distances through the use of relatively inexpensive and readily available refractive and reflective optical elements. The refractive and reflective optical elements create two illumination beams and recombine corresponding reflected beams to form an interferogram representative of a surface's topography, which is subsequently processed to extract measurement data and visual displays of that data. Unlike prior instruments, the invention uses no diffractive elements. A beam splitter (e.g. plate beam splitter or birefringent crystal) divides a single light beam from a substantially collimated source into two spatially distinct beams A and B. A combination of mirrors and anamorphic optics (e.g. prisms, cylindrical beam expander) directs beams A and B onto an object surface at two different angles of incidence $\alpha$ and $\beta$, respectively. A combination of mirrors and anamorphic optics (e.g. prisms, cylindrical beam expander) collects the reflected light beams A' and B' at two corresponding angles of reflection $\alpha'$ and $\beta'$. At least one of the anamorphic elements modifies the aspect ratio of one of the reflected beams, say beam A', so that the two rays reflected from any object point eventually end up at the same location on the detector. A beam splitter (e.g., plate beam splitter or birefringent crystal) recombines beams A' and B' into a single beam. Additional optics direct the recombined beam onto an imaging device (CCD, eye, diffusing screen) to generate an interference pattern having an equivalent wavelength Λ that is a function of the angles of incidence α and β, according to the formula:

$$\Lambda = \frac{\lambda}{\cos(\alpha) - \cos(\beta)},$$

where λ is the wavelength of the light source.

BRIEF DESCRIPTION OF THE DRAWINGS

The structure and operation of the invention, together with other objects and advantages thereof, may best be understood by reading the detailed description in conjunction with the drawings wherein the invention's parts have an assigned reference numeral that is used to identify them in all of the drawings in which they appear and wherein:

FIG. 1 is a diagrammatic perspective view of an embodiment of the invention comprising an optical head and computer in combination with an optical flat whose surface is to be profiled;

FIG. 2 is a diagrammatic perspective view of a three-dimensional contour map of the profile of the surface of the optical flat shown in FIG. 1;

DETAILED DESCRIPTION OF THE INVENTION

Figure 3:
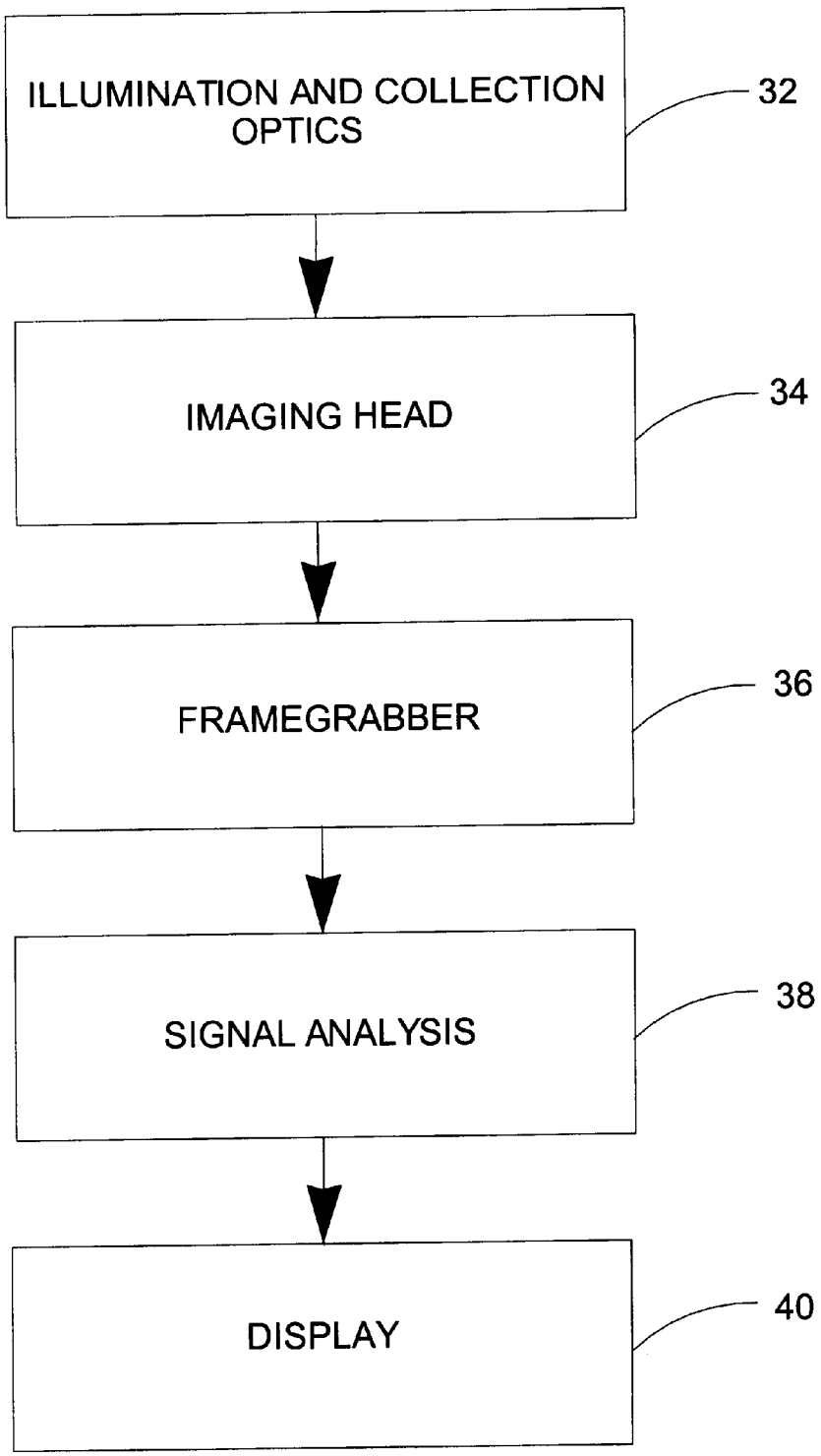
FIG. 3 is a high level flow chart illustrating the operation of the embodiment of FIG. 1.

The present invention relates to a geometrically desensitized interferometric system that utilizes purely nondiffractive optical elements in an optical head to facilitate fast 3-D surface analysis, high spatial measurement resolution, excellent measurement repeatability and reproducibility, and a large working distance to the test surface. Reference is now made to FIG. 1 which shows the interferometric system of the invention generally at 10. System 10 comprises an optical head 12 for illuminating a part, such as that shown at 14, and generating a signal containing information about the topology of its surface. The signal is transmitted via a cable 16 to a computer 18 that contains appropriate software to extract the information from the signal and display the results of measurements in a variety of visual formats selectable by a user via a graphical user interface (GUI). The computer software may also be equipped with features for performing system control and housekeeping tasks. An example of one of the types of displays possible is given by the three-dimensional map 20 shown in FIG. 3 which shows the variation of the surface topography of part 14. As will be seen, system 10 extends the range of interferometry without relying on expensive or exotic components, and its software also provides for continuous logging of reports and process statistics of any measurement result so that one or more parts can be followed by lot, batch, or individually.

As can be seen in FIG. 1, optical head 12 includes a housing 22 atop of which sits a generally circular pedestal having a similarly shaped part holder 26 sitting on top of it. Part holder is provided with an aperture 28 through which illumination passes to and from the surface of a part to be measured. Surrounding aperture 26 is a three-ball part support system (each ball is labeled as 30) that defines a plane in which the part resides as it is being measured. The three-ball support system plane is nominally perpendicular to the optical axis of the optical head 12. As will be appreciated, optical heads that look down at a part are easily constructed and are within the scope of this invention.

As seen in FIG. 3, which generally outlines the steps carried out in the operation of system, a part is first illuminated as in block 32 by light from a solid state laser that passes through an arrangement of purely nondiffractive optical elements, refracting and/or reflecting elements, to illuminate the test surface with two beams at different angles of incidence. Reflected beams are recombined resulting in an interference pattern with an equivalent wavelength 20 times longer than the optical wavelength of the illuminating light. During the measurement, piezoelectric transducers mechanically displace one of the elements, effecting a phase shift in the measurement beam which modulates the interference pattern.

Next, an electronic camera captures a sequence of phase-shifted interference patterns in block 34 and these are sent to a framegrabber in block 36. The framegrabber, which may be a board in computer 18, generates corresponding video signals and sends them to block 38 for analysis via suitable software resident in computer 18 or an equivalent dedicated microprocessor. As the result of the analysis performed via computer 18, signals are generated and forwarded to block 40 for display, the format of the display having been selected by the user. The display is an accurate portrayal of the shape and topography of the surface. The resulting measurement data can be displayed as high-resolution rotatable 3D graphics, sliced cross sections, numeric displays, and statistical plots.

Having described the general architecture of the invention, the details of various optical arrangements by which part surfaces may be illuminated to generate appropriate interferograms in accordance with geometrically desensitized interferometry will now be discussed. It will be appreciated that none of the embodiments to be described relies on the use of diffractive or other exotic optical elements.

Figure 4:
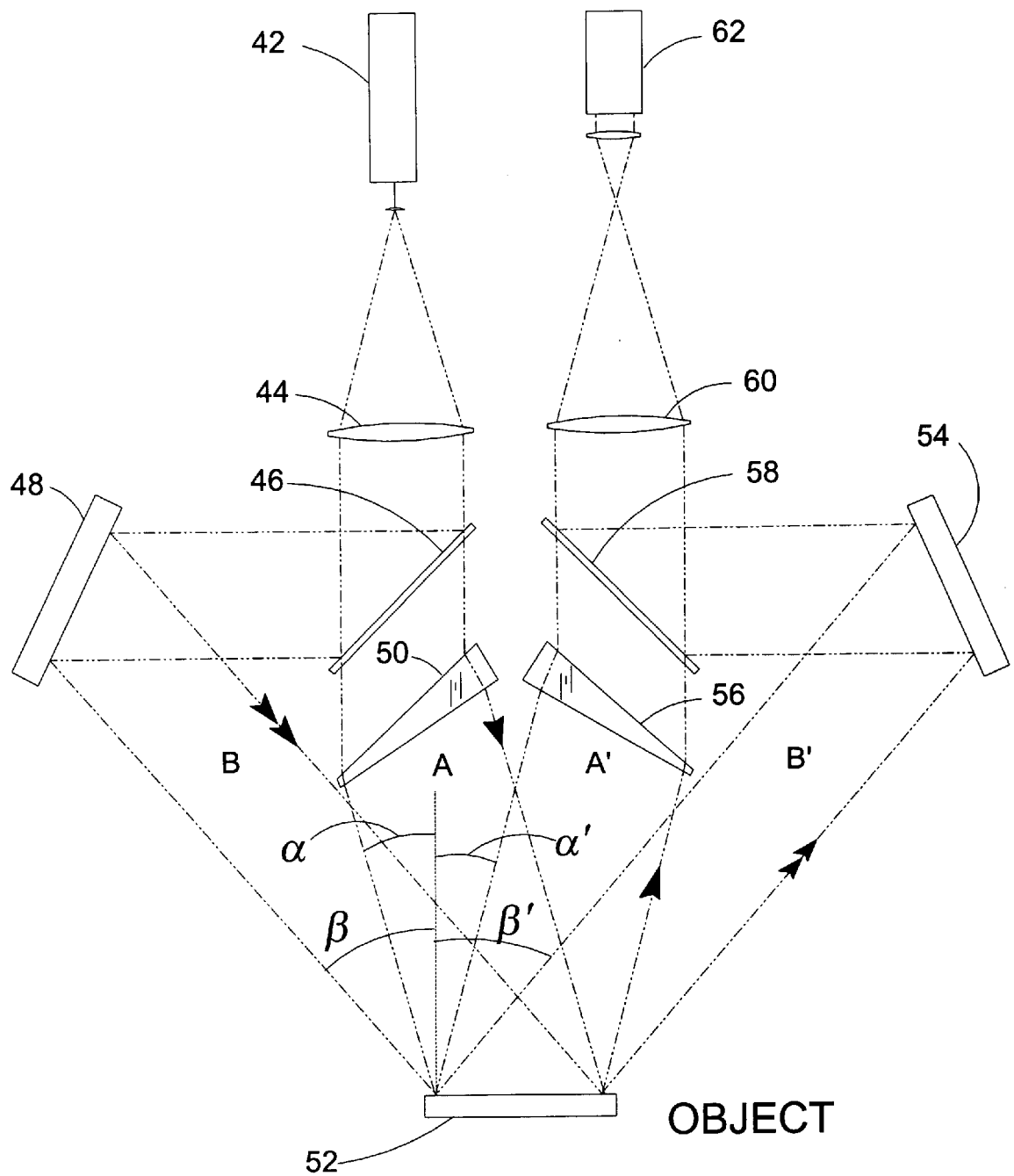
FIG. 4 is a diagrammatic elevational view of a first arrangement of nondiffractive optical elements for use in the optical head of FIG. 1.

Reference is now made to FIG. 4 which shows the components of a first embodiment of the invention for realizing a symmetric GDI. A laser 42 generates an output beam that is sent through a beam expander 44 to emerge as a collimated beam with a plane wavefront. A beam splitter 46 divides the beam emerging from beam expander 44 into two beams, beams A and B. A mirror 48 directs beam B towards the object surface with an angle of incidence β. Beam A goes through a prism 50, which results in an enlargement of the beam in the plane of the figure. The beam deviation caused by prism 50 is such that beam A is incident to the object with an angle of incidence, α. The object is located at the plane where beams A and B overlap in space. The beams overlap exactly at that plane in part due to the anamorphic effect of prism 50. To achieve symmetry with respect to the object normal, similar components (mirror 54, prism 56, and beamsplitter 58) collect and recombine the reflected beams A' and B'. The two recombined beams go through imaging optics 60 and interfere on the detector of a video camera 62 where they create a fringe pattern representative of the object surface topography.

One example using this arrangement comprised a He—Ne laser, prisms 50 and 56 were 10° prisms, angles of incidence α and β were close to 6.8° and 20.5° respectively. The measured equivalent wavelength Λ was close to 12 micrometers where:

$$\Lambda = \frac{\lambda}{\cos(\alpha) - \cos(\beta)},$$

and λ is the wavelength of the laser source.

Figure 5:
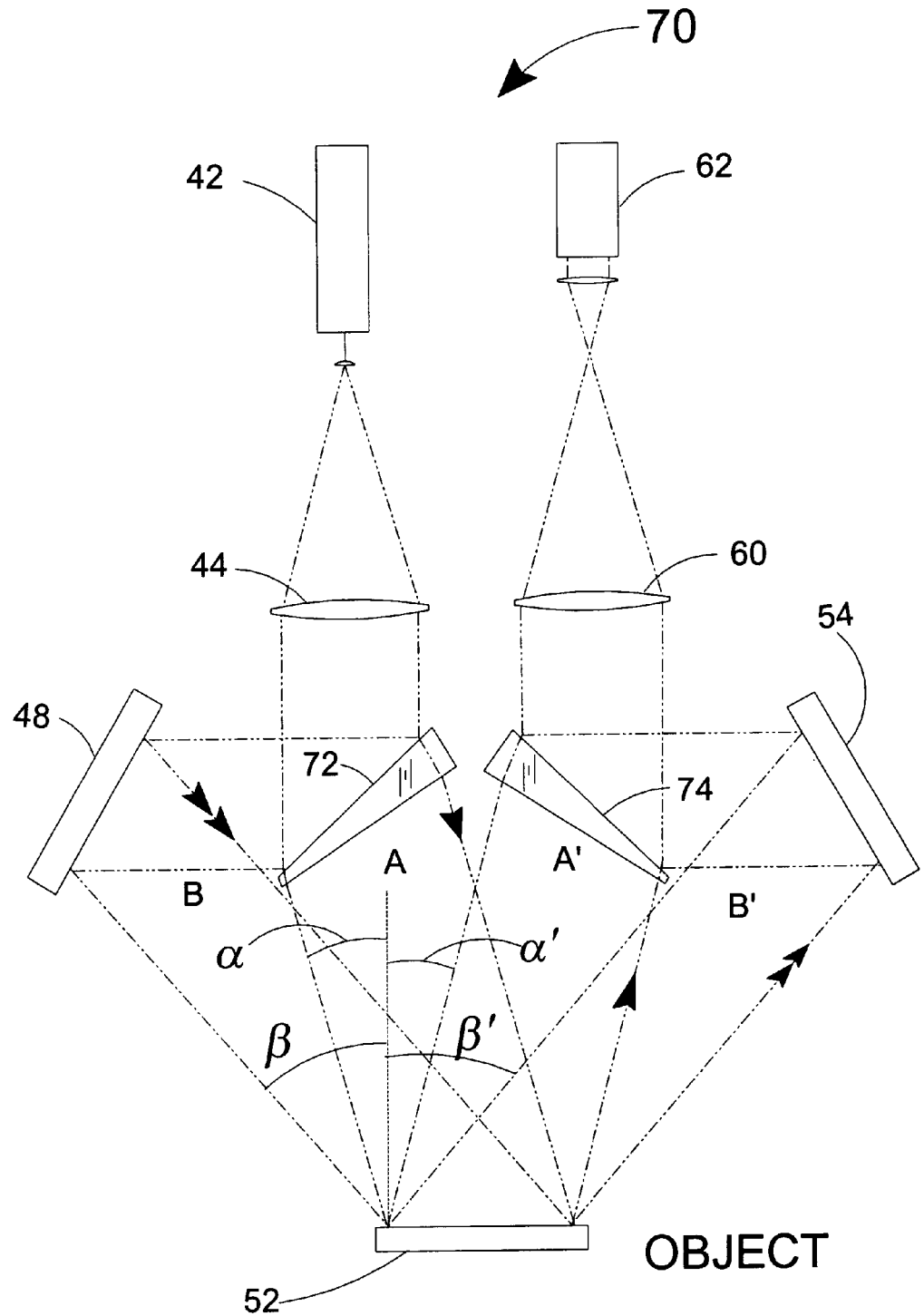
FIG. 5 is a diagrammatic elevational view of a second arrangement of nondiffractive optical elements for use in the optical head of FIG. 1 FIG. 6.

The second simpler embodiment is shown in FIG. 5 where the optical system is designated generally at 70. System 70 is similar in design to that of the first embodiment except that the beam splitting function and anamorphic effect of the first embodiment are combined in one single component in the form of prismatic beam splitters 72 and 74. Since beam splitter plates are usually slightly wedged to get rid of back reflections, it is possible to make this equivalent combination with the remaining components being the same as those used in the first embodiment.

Figure 6:
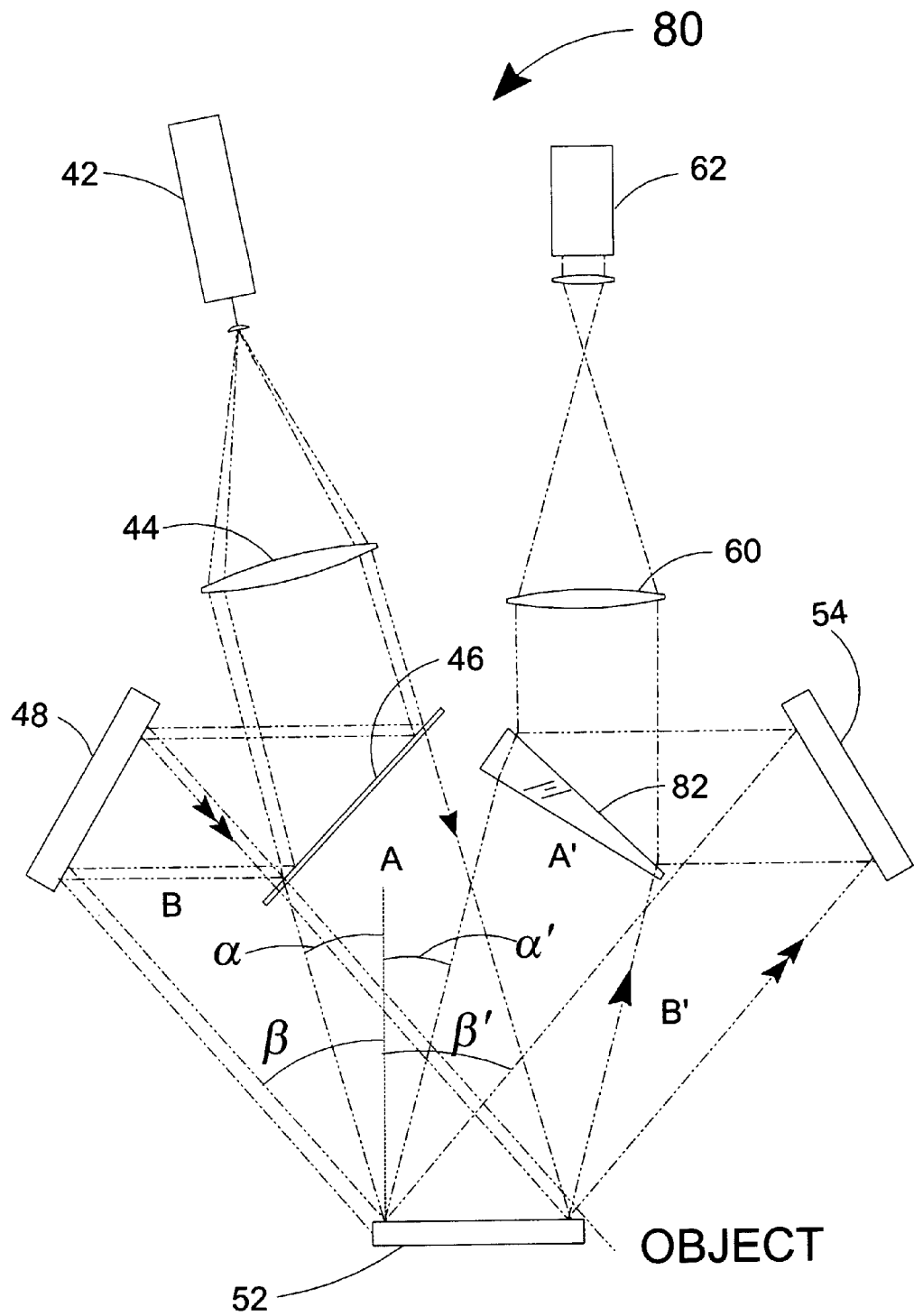

A third embodiment is shown in FIG. 6 where it is designated generally as system 80. System 80 uses many of the same components as were used in the first embodiment, and these elements are shown here with the same numerical identifiers they had in FIG. 4 and perform like functions as before. However, system 80 does not include any anamorphic elements on the illuminating side. Hence, the surface covered at the object plane by beam B is larger than the surface covered by beam A. However, the anamorphic element (here the prism beam splitter 82) located on the imaging side ensures that the two rays that impact and reflect from any object point under angles of incidence α and β are recombined and interfere on the detector of camera 62. As with the prior two embodiments; this is a fundamental requirement for any type of GDI instrument covering a substantial surface on the part. This configuration, however, makes less efficient use of available light since part of beam B is lost.

Figure 7:
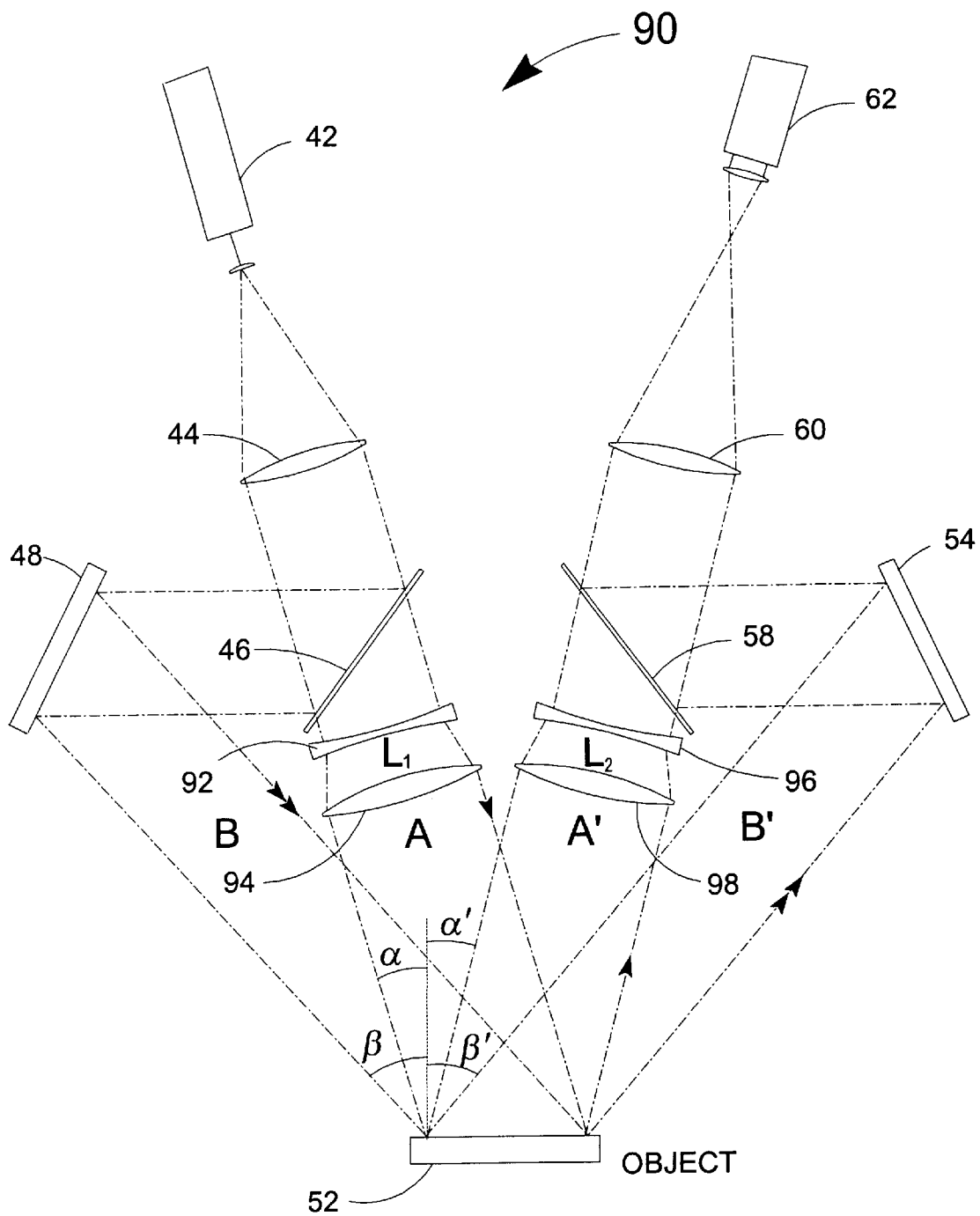
FIG. 7 is a diagrammatic elevational view of a third arrangement of nondiffractive optical elements for use in the optical head of FIG. 1.

A fourth embodiment is shown in FIG. 7 where it is designated generally at 90. System 90 uses many of the same components as were used in the first embodiment, and these elements are shown here with the same numerical identifiers they had in FIG. 4 and perform like functions as before. The fourth embodiment is an example of the use of cylindrical lens groups comprising lenses 92 and 94 on the illumination side and lenses 96 and 98 on the collection side to realize the anamorphic enlargement of beam A. Any type of equivalent anamorphic optical element could be used here. Embodiments 1 to 3 make use of prisms, embodiment 4 makes use of cylindrical lenses. As in embodiment 3, the first anamorphic group on the illumination side is not absolutely required contrary to the second anamorphic group on the collection side.

Figure 8:
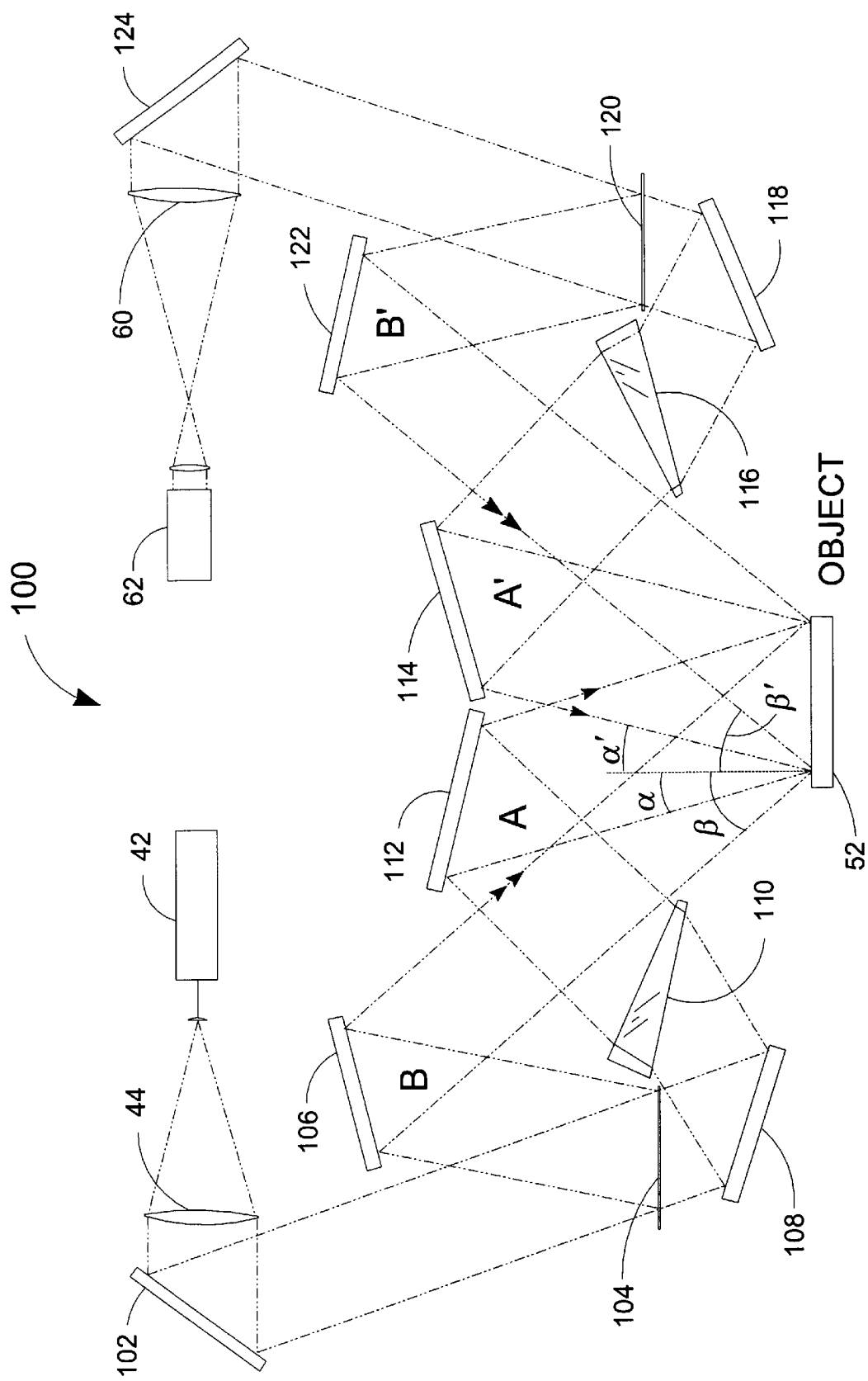
FIG. 8 is a diagrammatic elevational view of a fourth arrangement of nondiffractive optical elements for use in the optical head of FIG. 1.

Reference is now made to FIG. 8 which shows a fourth system that is generally designated as 100. System 100 uses many of the same components as were used in the first embodiment, and these elements are shown here with the same numerical identifiers they had in FIG. 4 and perform like functions as before. The main advantage is that the interferometer is of the equal-path type. In other words, the lengths of the optical paths followed by beam A and beam B, respectively, are equal. As a consequence, this design may use spatially extended, incoherent light sources such as super luminescent or conventional light-emitting diodes, laser light projected onto rotating glass, filtered halogen bulbs, arc lamps, or and the like. As seen, system 100 comprises, on the illumination side, a mirror 102, beam splitter 104 for dividing the laser beam into beam A and B, mirrors 106 and 108 on either side of beam splitter 104 for folding beams B and A, respectively, a prism 110, and a folding mirror 112 downstream of beam splitter 110. On the collection side is a fold mirror 114 followed by a prism 116 which in turn is followed by a fold mirror 118, all for return beam A'. Mirror 122 folds beam B' and directs it to beam splitter 120 which operates to recombine beams A' and B' into a single beam that travels to a fold mirror 124. Following mirror 124 imaging proceeds as before. This embodiment is also the optimum configuration for measuring rough objects because of the equal path length configuration. Prisms 110 and 116 could be exchanged for other types of anamorphic elements.

Figure 9:
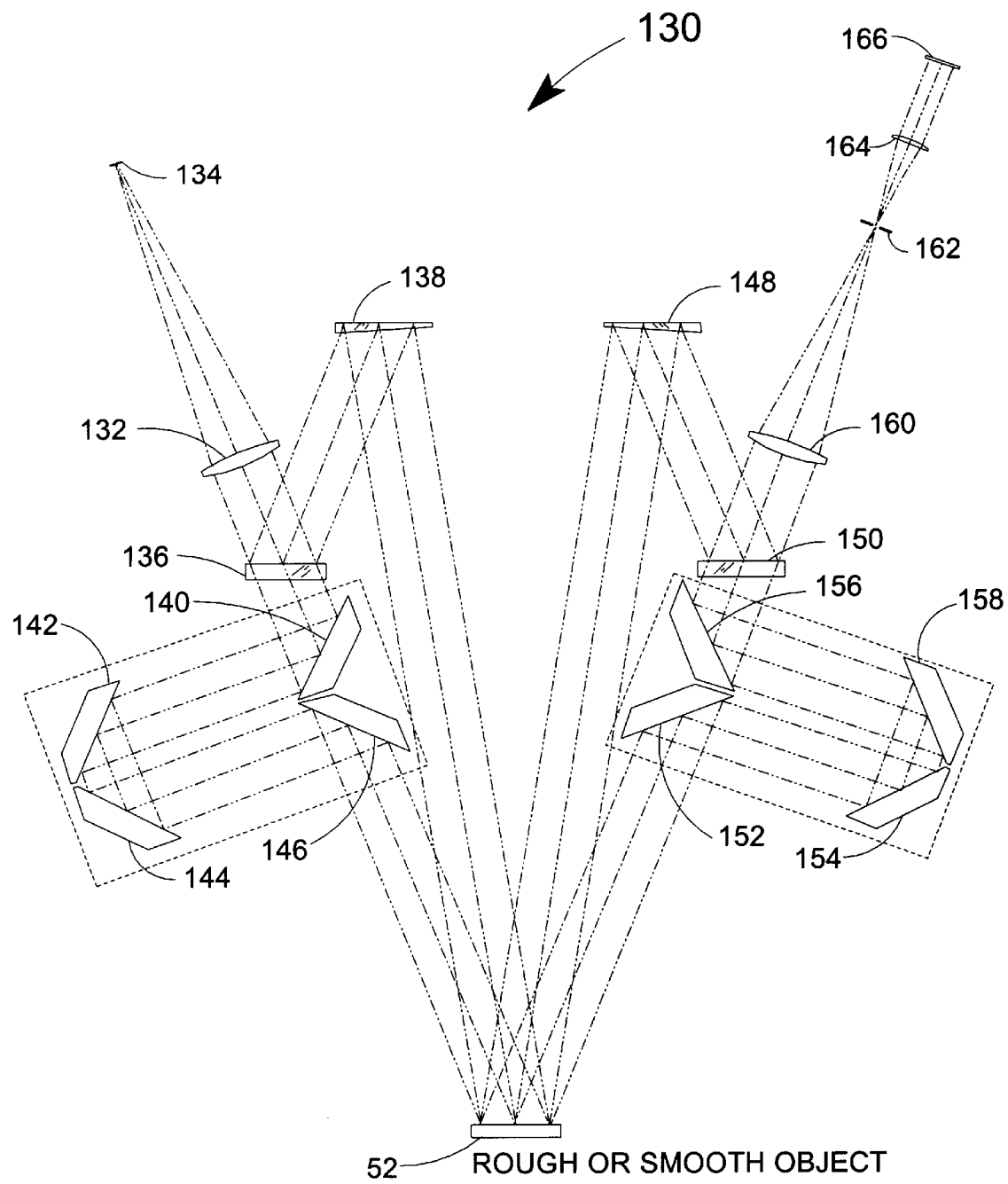
FIG. 9 is a diagrammatic elevational view of a fifth arrangement of nondiffractive optical elements for use in the optical head of FIG. 1.

Reference is now made to FIG. 9 which illustrates a fifth embodiment of the invention. The fifth embodiment is designated generally as system 130. A lens 132 is used to collimate the light created by a possibly extended source 134. The collimated beam is split in two at the beamsplitter 136. One beam reflects towards a first prism 138 where it reflects again, this time going down towards the object. Reflection occurs inside the prism. The front surface is transparent (possibly antireflection coated) while the back surface is a mirror. The refraction occurring inside prism 138 creates the anamorphic effect required for the instrument. The second part of the initial laser beam is transmitted by beamsplitter 136 and goes through a phase delay line made of four mirrors, 140, 142, 144, and 146. The purpose of this arrangement is to adjust the optical path length of this arm of the interferometer to match the corresponding optical path length of the beam going through the prism 138. Both beams A and B reflect from the object and are recombined by a symmetrical combination of optical components on the collection side. On the collection side, there are a prism 148, a beam splitter 150, converging imaging lens 160, another delay section comprising mirrors 152, 154, 156, and 158, an aperture stop 162, imaging lens 164 and detector 166. After recombining on the second beamsplitter 150, the two beams A' and B' are sent onto detector 166 by imaging optics made up of the combination of lenses 160 and 164.

In practice, the first phase delay line is adjusted so that the optical path from beam splitter 136 to the object is substantially the same for beam A going through the prism 138 after reflection from beam splitter 136 and the beam B transmitted by beam splitter 136. The same condition is achieved on the imaging side of the interferometer. Thus, the optical path from the object to beam splitter 150 is substantially the same for beam A' going through the second prism 148 and beam B' going through the delay line itself Because of the delay lines, the interferometer is adjusted very close to the equal path condition.

The other function of lenses 160 and 164 is to image the object onto the detector 166. When the object is rough, the aperture stop 162 defines the numerical aperture of the beams collected by lens 160. The two waves can be described as grainy random light fluctuation, called speckles. In order to obtain the maximum possible fringe contrast, the two speckle waves recombined by beamsplitter 150 should correlate or overlap as perfectly as possible. There is good correlation when the two random patterns are identical when they reach beam splitter 150. This means that the optical path from the object to beam splitter 150 has to be equal along both arms of the imaging part of the interferometer. This is achieved when adjusting the second phase delay line. However, the anamorphic correction performed by the second prism 148 introduces some astigmatism in the corresponding beam A'. This aberration results in a modification of one of the two speckle waves, lowering the correlation between the two patterns and consequently lowering the fringe contrast. The practical solution consists in limiting the size of aperture stop 162. The angular width of the beams A' and B' collected by lens 160 is then small, and the effect of the aberration is greatly reduced at the expense of the light efficiency of the instrument.

It should also be noted that the telecentric imaging optics comprising lenses 160 and 164 is shown diagrammatically in FIG. 9. The focal length of lens 160 is actually larger since the object is located at the object focal plane of this lens. Consequently, aperture stop 162, located at the image focal plane of 160, should be drawn at a much larger distance from lens 160. However, the size of the drawing would then become impractical without providing much additional understanding of the principle of the instrument.

Figure 10:
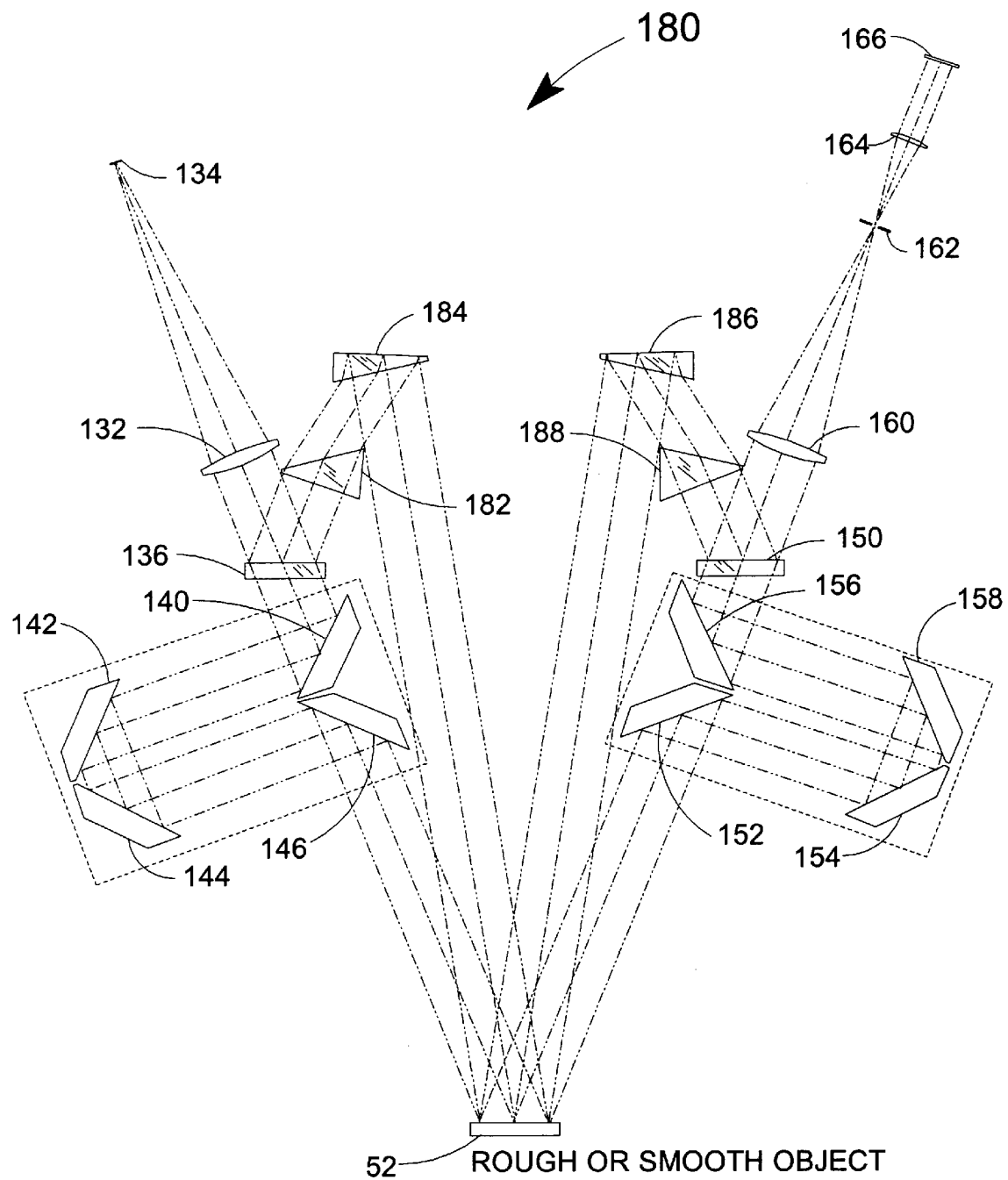
FIG. 10 is a diagrammatic elevational view of a sixth arrangement of nondiffractive optical elements for use in the optical head of FIG. 1.

Reference is now made to FIG. 10 which shows a sixth embodiment of the invention. The sixth embodiment is designated generally as system 180 and uses many of the elements as were used in the fifth embodiment which elements carry the same numerical identification here and like functions as well. However, the astigmatism that was inherent to the fifth embodiment can be suppressed by the addition of two prisms in the illumination and collection paths. For example, on the collection side, prism 186 introduces an anamorphic correction that is larger than what is really required. This creates a certain amount of astigmatism. The aspect ratio correction is then adjusted to the desired value when the beam goes through prism 188. Since the sign of the aberration depends on the sign of the anamorphosis due to the prism refraction, prism 188 creates astigmatism of opposite sign. The result is a cancellation of the two contributions, restoring the imaging capabilities of the imaging lens at large numerical aperture values. Further correction can be achieved by adjusting the thickness of beam splitter 150 so that the two speckle waves go through the same glass thickness. This reduces the imbalance between the spherical aberration created on the two different paths. Prisms 182 and 184 play similar roles on the illumination side.

Figure 11:
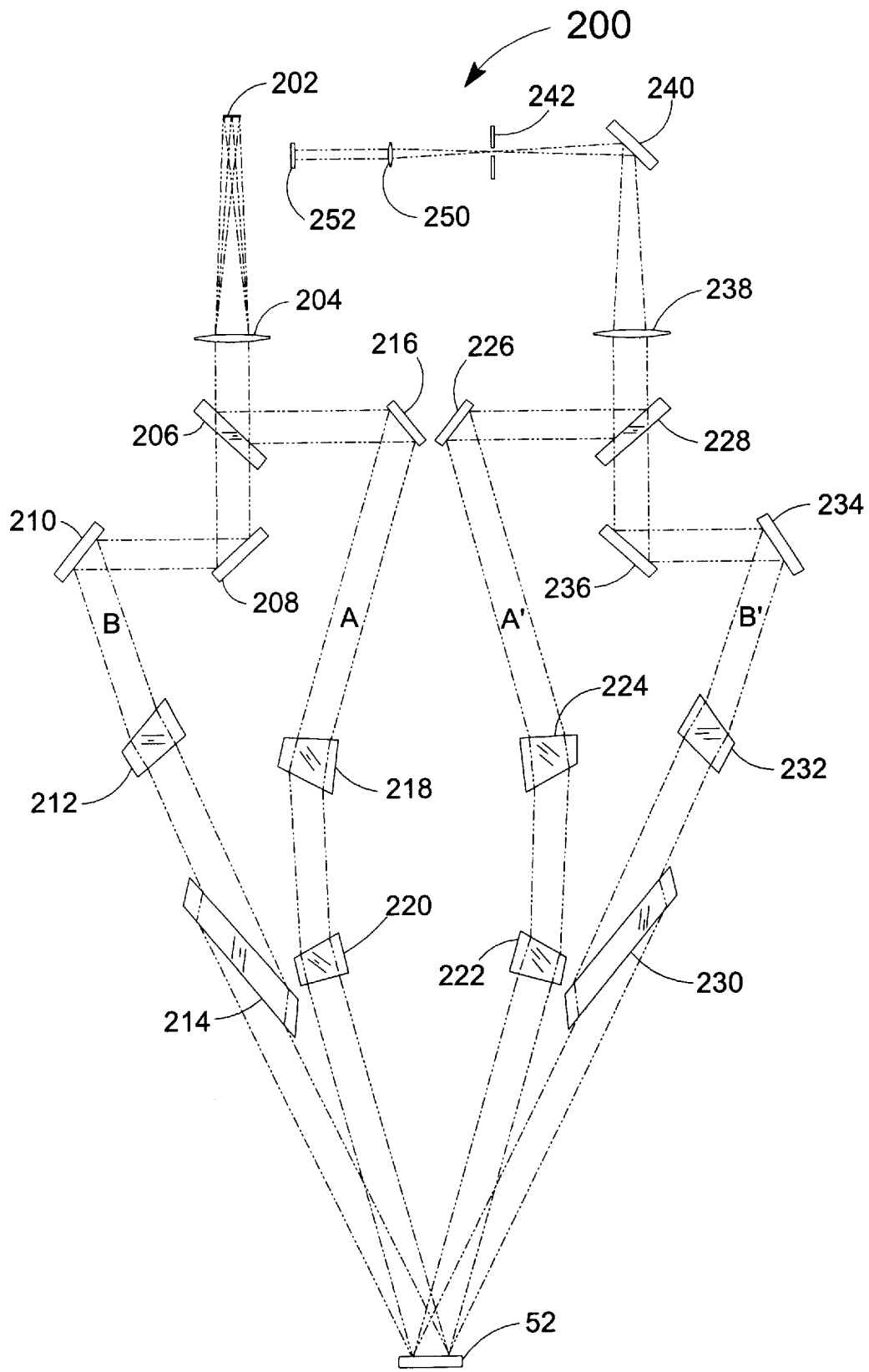
FIG. 11 is a diagrammatic elevational view of a seventh arrangement of nondiffractive optical elements for use in the optical head of FIG. 1.

Reference is now made to a seventh embodiment illustrated in FIG. 11 as system 200. The previous embodiments required a light source of very limited spatial extent, for example a focused laser beam. However, it is sometimes useful to use an extended source in order to control the extent of the object volume where fringes are obtained. This could be used to create a limited coherence envelope used for a scanning version of the interferometer. When the source is extended, the final interferogram is the superposition of the interferograms created for the different elementary source points. Each source point actually defines a slightly different interferometer, resulting in a slightly different equivalent wavelength. However, it is important that when comparing different source points:
1. the optimum metrology plane remains at the same location in space; and
2. the optical path difference remains constant at each point on that plane.

These requirements are not satisfied by the previously described embodiments but are satisfied by the 8-prism configuration shown in FIG. 11. The stability of the optimum metrology plane is specifically targeted during optical design. System 200 is additionally optimized so that the astigmatism of the imaging leg of the instrument is negligible. The optical path difference between the two measurement beams is zero at the optimum metrology plane. A further improvement of this design consists in making the different prisms achromatic. In this case each prisms in FIG. 11 brakes down into two sub-prisms made of different materials. It is then possible to use a source that is both extended and temporally incoherent. This makes it possible to use sources that are cheaper than lasers while suppressing most of the disturbing coherent artifacts created by coherent light, including speckles in the final image.

As seen in FIG. 11, on the illumination side, an extended source 202 is collimated by a lens 204 after which the collimated beam is divided by a beam splitter 206 into beams A and B. Beam B proceeds toward the object by first reflecting off a pair of fold mirrors 208 and 210 and then through a pair of prisms 212 and 214. Beam A proceeds to the object via a fold mirror 216 and a pair of prisms 218 and 220.

On the collection side, Beam A' proceeds from the object to a detector 252 via a pair of prisms 222 and 224 after which it is reflected from a fold a mirror 226 to travel to a beam splitter 228. Beam B' proceeds from the object to the detector 252 via a pair of prisms 230 and 232 which are followed by a pair of fold mirrors 234 and 236. After leaving mirror 236, beam B' is recombined with beam A' at beam splitter 228. The recombined pair of beams proceed to detector 252 via a pair of imaging lenses 238 and 250 having an aperture stop 242 and an intervening fold mirror 240. To measure smooth surfaces in accordance with the invention, all of the foregoing embodiments must have the two beams impinging on the object surface from two different angles of incidence, α and β, respectively, corresponding to incident beams A and B, the recombined beams A' and B' must come from the same point on the object surface and be imaged on the same detector point, (A+A')−(B+B') must be less than the coherence length of the source and be constant over the field. If rough surfaces are to be measured as well, then A' must substantially equal B' as an additional condition.

In order to permit PSI analysis of the acquired data in any of the foregoing embodiments, a phase shifter preferably is incorporated into the instrument to induce a periodic phase shift in light traveling through the optical assembly. The phase shifter is preferably coupled to a component of the optical assembly and is arranged to effect periodic movement of the component over a range typically of a few microns in extent.

A phase shifter may comprise any device that induces a periodic phase difference between light received at two pixels of the imaging detector in order to permit analysis of the interference fringe patterns by PSI. Phase shifting preferably is achieved by varying the optical path of the one of the light beams during image acquisition. This variation may be achieved in the illustrated embodiments by configuring the phase shifter as a transducer that is coupled. e.g., to one of the mirrors or beam splitters, and controllable by the computer. Alternatively, a phase shifter could be coupled to one of the elements on the input end of the instrument or to the stage supporting the object to be measured in which case the object would be moved along the optical axis of the instrument.

In order to permit longer scans for sectioning complex surface features, a scanning stage may, if desired, also be included to permit translation of the object with respect to the instrument.

In accordance with the teachings above, the source of illumination need not strictly be a laser so long as the coherence condition is satisfied. If the optical path lengths at the output end are not equal, a highly coherent source is preferable. Wherever it is preferable to employ a high coherence source use may be made of gas, solid state, or semiconductor lasers or laser diodes.

The result of this invention is that a new family of GDIs have been provided without any diffractive element. The core of the invention consists in the use of a combination of refractive and reflective optical elements to adjust the respective size of the two interfering beams. This assures that the two rays (belonging to beams A' and B') that interfere at any point of the detector actually come from the same object point.

This novel family of GDIs possesses the same fundamental properties as grating-based instruments; namely, the ability to perform measurements on rough and polished surfaces presenting large departures from flatness. The advantages of the present invention compared with two-grating or single-grating types include the elimination of costly diffraction gratings, which do not scale up easily whereas a large aperture GDI can be designed with classical optical components; long working distance, and better light efficiency since no light is lost by scattering within the grating material or by diffraction in unused diffracted orders. The absence of scattering and unwanted back reflections dramatically reduces the background light level, which makes it possible to measure highly diffusing objects such as ceramics with a high-power source.

Other modifications of the described embodiments will be apparent to those skilled in the art based on the teachings of the invention and are intended to come within the scope of the appended claims.

What is claimed is:

1. A full-field geometrically desensitized interferometer for measuring the profile of an object surface, said interferometer comprising:

means for generating first and second beams of radiation that have predetermined finite cross-sectional dimensions and travel along different paths;

a first group of nondiffractive optical elements positioned along said paths for receiving said first and second beams of radiation and directing them at said object so that they are incident to said object surface at essentially the same location and area but from different angles of incidence, said incident beams reflecting from said object surface so that, upon reflection, they travel along different paths of propagation as separate reflected beams;

a beam combiner located downstream of said reflected beams;

a second group of nondiffractive optical elements for receiving said reflected beams and directing them at said beam combiner such that said reflected beams are combined into a single beam containing information about the profile of the object surface;

a photodetector located downstream of said beam combiner; and imaging optics for receiving said single combined beam and forming an interference pattern on said photodetector, said second group of nondiffractive optical elements, said beam combiner, and said imaging optics being arranged such that radiation reflected from each object point contained in each of said reflected beams is uniquely mapped to a corresponding point on said detector.

2. The interferometer of claim 1 wherein said means for generating said first and second beams of radiation comprises at least one source for generating a beam of radiation and a splitter for dividing said beam of radiation into said first and second beams.

3. The interferometer of claim 2 wherein said source for generating a beam of radiation comprises a high coherence radiation source.

4. The interferometer of claim 3 wherein said high coherence source is selected from the group including lasers and laser diodes.

5. The interferometer of claim 3 wherein said source for generating a beam of radiation further includes a beam expander and collimating optics for producing a beam having a plane wavefront.

6. The interferometer of claim 2 wherein said first group of nondiffractive optical elements comprises at least one mirror.

7. The interferometer of claim 6 wherein said first group of nondiffractive optical elements comprises at least one prism for adjusting the size of at least one of said incident beams so that both substantially overlap the same area of the object surface.

8. The interferometer of claim 7 wherein said second group of nondiffractive optical elements comprises at least one mirror and one prism adjusting the size of at least one of said reflected beams so that the two reflected beams overlap one another at said combiner.

9. The interferometer of claim 8 wherein said splitter and said prism in said first group are combined as one optical element and said combiner and said prism in said second group are also combined as one optical element.

10. The interferometer of claim 8 wherein said splitter and first group of nondiffractive optical elements, taken together, are bilaterally symmetric with respect to said combiner and said second group of nondiffractive optical elements, taken together.

11. The interferometer of claim 2 wherein the optical paths over which said reflected beams travel from the object surface to said detector are equal.

12. The interferometer of claim 11 wherein the optical paths traveled by said incident beams from said splitter to the object surface are equal.

13. The interferometer of claim 1 wherein at least one of said first and said second groups of optical elements comprises an anamorphic lens for adjusting the size of at least one of said incident and reflecting beams so that they overlap.

14. The interferometer of claim 1 wherein at least one of said first and second groups of said nondiffractive optical elements includes a optical delay line to assure that the optical paths traveled by said incident and reflected beams is equal.

15. The interferometer of claim 1 wherein at least one of said first and second groups of nondiffractive optical elements comprises a pair of prisms that collectively correct for astigmatism.

16. The interferometer of claim 1 wherein said first and second groups of nondiffractive optical elements are configured to permit the use of an extended source.

17. The interferometer of claim 16 wherein said first and second groups of nondiffractive optical elements are achromatized to permit use of a temporally incoherent source.

18. The interferometer of claim 1 further comprising a phase shifter for inducing periodic phase shifts in said beams as they travel through said interferometer.

19. A geometrically desensitized interferometric method for measuring the profile of an object surface, said method comprising the steps of:
   generating first and second beams of radiation that have predetermined finite cross-sectional dimensions and travel along different paths;
   receiving said first and second beams of radiation with a first group of nondiffractive optical elements and directing them at said object so that they are incident to said object surface at essentially the same location and area but from different angles of incidence, said incident beams reflecting from said object surface so that, upon reflection, they travel along different paths of propagation as separate reflected beams;
   receiving said reflected beams and combining them with a second group of nondiffractive optical elements such that said reflected beams are combined into a single beam containing information about the profile of the object surface; and
   receiving said single combined beam and forming an interference pattern on a photodetector such that radiation reflected from each object point contained in each of said reflected beams is uniquely mapped to a corresponding point on said detector.

20. The geometrically desensitized interferometric method of claims 19 wherein the step of generating said first and second beams comprises the steps of generating one beam and splitting it into said first and second beams.

21. The geometrically desensitized interferometric method of claim 20 wherein said first and second beams of radiation comprise coherent radiation.

22. The geometrically desensitized interferometric method of claim 21 wherein said first and second beams of radiation are collimated beam having a plane wavefront.

23. The geometrically desensitized interferometric method of claim 21 further comprising the step of adjusting the size of at least on one of said incident beams and reflected beams so that they overlap.

24. The geometrically desensitized interferometric method of claim 21 wherein the optical paths over which said reflected beams travel from the object surface to the detector are equal.

25. The geometrically desensitized interferometric method of claim 21 wherein the optical paths over which said incident beams travel to the object surface after splitting are equal.

26. The geometrically desensitized interferometric method of claim 21 further including the step of delaying at least one of said incident and reflected beams so that the optical paths over which each incident and reflected beam is substantially the same.

27. The geometrically desensitized interferometric method of claim 21 further including the step of correcting astigmatism in at least one of said incident and reflected beams.

28. The geometrically desensitized interferometric method of claim 21 further including the step of correcting for variations of the optimum measurement location when using a spatially extended source.

29. The geometrically desensitized interferometric method of claim 21 further including the step of removing chromatic aberrations from the incident and reflected beams.

30. A full-field geometrically desensitized interferometer for measuring the profile of an object surface, said interferometer comprising:
   means for generating first and second beams of radiation that travel along different paths, said means for generating said first and second beams of radiation comprising at least one source for generating a beam of radiation and a splitter;
   a first group of nondiffractive optical elements positioned along said paths for receiving said first and second beams of radiation and directing them at said object so that they are incident to said object surface at essentially the same location but from different angles of incidence, said incident beams reflecting from said object surface so that, upon reflection, they travel along different paths of propagation as separate reflected beams, said first group of nondiffractive optical elements comprising at least one mirror;
   a beam combiner located downstream of said reflected beams;
   a second group of nondiffractive optical elements for receiving said reflected beams and directing them at said beam combiner such that said reflected beams are combined into a single beam containing information about the profile of the object surface, said second group of nondiffractive optical elements comprising at least one mirror and one prism for adjusting the size of at least one of said reflected beams so that the two reflected beams overlap one another at said beam combiner;
   a photodetector located downstream of said beam combiner; and
   imaging optics for receiving said single combined beam and forming an interference pattern on said photodetector, said second group of nondiffractive optical elements, said beam combiner, and said imaging optics being arranged such that radiation reflected from each object point contained in each of said reflected beams is uniquely mapped to a corresponding point on said detector.

31. A full-field geometrically desensitized interferometer for measuring the profile of an object surface, said interferometer comprising:
   means for generating first and second beams of radiation that travel along different paths;
   a first group of nondiffractive optical elements positioned along said paths for receiving said first and second beams of radiation and directing them at said object so that they are incident to said object surface at essentially the same location but from different angles of incidence, said incident beams reflecting from said object surface so that, upon reflection, they travel along different paths of propagation as separate reflected beams;
   a beam combiner located downstream of said reflected beams;
   a second group of nondiffractive optical elements for receiving said reflected beams and directing them at said beam combiner such that said reflected beams are combined into a single beam containing information about the profile of the object surface;
   a photodetector located downstream of said beam combiner; and imaging optics for receiving said single combined beam and forming an interference pattern on said photodetector, said second group of nondiffractive optical elements, said beam combiner, and said imaging optics being arranged such that radiation reflected from each object point contained in each of said reflected beams is uniquely mapped to a corresponding point on said detector and wherein at least one of said first and said second groups of optical elements comprises an anamorphic lens for adjusting the size of at least one of said incident and reflecting beams so that they overlap.

* * * * *